US012465543B2

(12) United States Patent
Okun et al.

(10) Patent No.: US 12,465,543 B2
(45) Date of Patent: Nov. 11, 2025

(54) PASSIVE EXOSKELETON FOR SIT-TO-STAND AND STAND-TO-SIT TRANSFER

(71) Applicants: Jake Okun, Scottsdale, AZ (US); Thomas Sugar, Chandler, AZ (US)

(72) Inventors: Jake Okun, Scottsdale, AZ (US); Thomas Sugar, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 526 days.

(21) Appl. No.: 17/938,578

(22) Filed: Oct. 6, 2022

(65) Prior Publication Data

US 2023/0111298 A1 Apr. 13, 2023

Related U.S. Application Data

(60) Provisional application No. 63/392,239, filed on Jul. 26, 2022, provisional application No. 63/254,644, filed on Oct. 12, 2021.

(51) Int. Cl.
*A61H 1/02* (2006.01)

(52) U.S. Cl.
CPC ......... *A61H 1/0237* (2013.01); *A61H 1/0266* (2013.01); *A61H 2201/0161* (2013.01);
(Continued)

(58) Field of Classification Search
CPC ...... A61H 1/00–0296; A61H 3/00–068; A61H 2201/0161; A61H 2201/1253;
(Continued)

(56) References Cited

U.S. PATENT DOCUMENTS 2,853,999 A * 9/1958 Risser .................. A61H 1/0222 602/39
6,500,210 B1 12/2002 Sabolich et al.
(Continued)

FOREIGN PATENT DOCUMENTS

WO 2012154580 A1 11/2012
WO 2013086035 A1 6/2013
(Continued)

OTHER PUBLICATIONS

Sugar, T. et al., • Wearable Robots for Worker Assistance—17464, Arizona State University, Wearable Robotics Association. (2017) 1-5.

(Continued)

*Primary Examiner* — Timothy A Stanis
*Assistant Examiner* — Kira B Daher
(74) *Attorney, Agent, or Firm* — SNELL & WILMER L.L.P.

(57) ABSTRACT

A wearable passive exoskeleton device for sit-to-stand and/or stand-to-sit transfer includes a leg exoskeleton frame configured to be worn at a user's leg and a lever arm rotatably coupled to the leg exoskeleton frame so as to provide a handle for the user to move between a sitting position and a standing position (or between a kneeling position and a standing position). The lever arm is rotatable with respect to the leg exoskeleton frame between a stowed position and a deployed position. The lever arm may be a unidirectional lever arm configured to rotate only in a first rotational direction with respect to the leg exoskeleton frame such that a pushing or pulling force exerted in a second rotational direction transmits an assisting force to the user to assist in a sit-to-stand and/or stand-to-sit movement.

9 Claims, 13 Drawing Sheets

(52) U.S. Cl.
CPC .. *A61H 2201/14* (2013.01); *A61H 2201/1635* (2013.01); *A61H 2201/164* (2013.01); *A61H 2201/165* (2013.01); *A61H 2201/1654* (2013.01); *A61H 2201/1671* (2013.01); *A61H 2201/1676* (2013.01); *A61H 2203/0406* (2013.01); *A61H 2203/0431* (2013.01)

(58) Field of Classification Search
CPC ........ A61H 2201/14; A61H 2201/1635; A61H 2201/164; A61H 2201/1642; A61H 2201/165; A61H 2201/1654; A61H 2201/1671; A61H 2201/1676; A61H 2003/001–0283; A61H 2203/0406; A61H 2203/0431; B25J 9/0006; A61G 7/053; A61G 5/14
See application file for complete search history.

(56) References Cited

U.S. PATENT DOCUMENTS

| | | | | |
|---|---|---|---|---|
| 6,540,703 | B1 | 4/2003 | Lerman | |
| 7,125,388 | B1 | 10/2006 | Reinkensmeyer et al. | |
| 7,137,998 | B2 | 11/2006 | Bedard | |
| 8,060,945 | B2 | 11/2011 | Adarraga | |
| 8,171,570 | B2 | 5/2012 | Adarraga | |
| 8,244,655 | B2 | 8/2012 | Hubbard et al. | |
| 9,198,821 | B2 | 12/2015 | Unluhisarcikli et al. | |
| 9,808,073 | B1 | 11/2017 | Maxwell et al. | |
| 2005/0258210 | A1 | 11/2005 | Chu | |
| 2007/0123997 | A1 | 5/2007 | Herr et al. | |
| 2008/0046096 | A1 | 2/2008 | Bedard et al. | |
| 2009/0216156 | A1 | 8/2009 | Lengsfeld et al. | |
| 2011/0040216 | A1 | 2/2011 | Herr et al. | |
| 2011/0126872 | A1* | 6/2011 | Albertyn | A61H 3/02 135/69 |
| 2012/0226917 | A1 | 9/2012 | Wiseman et al. | |
| 2013/0292988 | A1* | 11/2013 | Jeyasurya | A61G 5/128 297/423.26 |
| 2014/0213951 | A1 | 7/2014 | Pietrusisnki et al. | |
| 2015/0190249 | A1* | 7/2015 | Ishibashi | A61F 5/01 623/24 |
| 2016/0229049 | A1* | 8/2016 | Angold | A61H 3/00 |

FOREIGN PATENT DOCUMENTS

| | | | | |
|---|---|---|---|---|
| WO | WO-2016068445 | A2 * | 5/2016 | A61H 3/02 |
| WO | 2018017436 | A1 | 1/2018 | |
| WO | 2018122106 | A1 | 7/2018 | |

OTHER PUBLICATIONS

ISA; International Search Report and Written Opinion mailed Jun. 29, 2021 in PCT/US2021/017406.

ISA; International Search Report and Written Opinion mailed Feb. 18, 2022 in PCT/US2021/062081.

Brandon Martin, W. et al., Aerial Porter Exoskeleton (APEX) for Lifting and Pushing, (2020).

Brandon Martin, W. et al., Development and Initial Testing of the Aerial Porter Exoskeleton (APEx), (2020) 1-14.

Kim, J. et al., Autonomous and portable soft exosuit for hip extension assistance with online walking and running detection algorithm, International Conference on Robotics and Automation. (2018) 5473-5480.

Okun, J. et al., Passive Exoskeleton for Sit-to-Stand and Stand-to-Sit Transfer, Arizona State University. (2021).

Okun, J. et al., Passive Exoskeleton for Sit-to-Stand Transfer, Arizona State University. (2021).

Sridar, S. et al., Development of a Soft-Inflatable Exosuit for Knee Rehabilitation, International Conference on Intelligent Robots and Systems. (2017) 3722-3727.

Sugar, T. et al., Hip Exoskeleton for Lift Assist and Pushing, Arizona State University. (2019).

Thalman, C. et al., A Novel Soft Elbow Exosuit to Supplement Bicep Lifting Capacity, International Conference on Intelligent Robots and Systems. (2018) 6965-6971.

* cited by examiner

PASSIVE EXOSKELETON FOR SIT-TO-STAND AND STAND-TO-SIT TRANSFER

CROSS REFERENCE TO RELATED APPLICATIONS

This application claims priority to, and the benefit of, U.S. Provisional Patent Application Ser. No. 63/254,644, entitled "PASSIVE EXOSKELETON FOR SIT-TO-STAND AND STAND-TO-SIT TRANSFER," filed on Oct. 12, 2021. This application also claims priority, to, and the benefit of, U.S. Provisional Patent Application Ser. No. 63/392,239, entitled "PASSIVE EXOSKELETON FOR SIT-TO-STAND AND STAND-TO-SIT TRANSFER," filed on Jul. 26, 2022. Each of the foregoing applications are hereby incorporated by reference in their entirety for all purposes (except for any subject matter disclaimers or disavowals, and except to the extent of any conflict with the disclosure of the present application, in which case the disclosure of the present application shall control).

TECHNICAL HELD

The present disclosure relates to robotic systems, and in particular to exoskeletons for use in connection with improving human capability.

BACKGROUND

It is often difficult, if not impossible at times, for disabled or older individuals to assume a standing position from a recumbent position; that is, from a sitting posture. Typically, in order to move from a recumbent position to a standing position, one must lift themselves up using their legs, specifically, the quadriceps, hamstrings, and glutes. People, especially those with weak or damaged muscles, often utilize a nearby support surface (e.g., a chair handle, a cane, or the like) to either pull themselves up or push against the surface when transitioning from a lowered position to a standing position. This is common for elderly individuals, and for workers who are constantly, transitioning between a lowered position and a standing position.

The majority of existing assistive exoskeleton devices do not provide a passive solution, allowing the user to assist their weaker lower body muscles in safely lifting and lowering themselves. Conventional assistive exoskeleton devices do not allow a person to instantly transfer their weight to assist them in rising from the floor or from a chair/bed in a kneeling or upright position. Conventional powered or active assistive exoskeleton devices are typically large, uncomfortable, and expensive to manufacture. Accordingly, improved devices and systems remain desirable.

SUMMARY

A wearable passive exoskeleton device for sit-to-stand transfer is disclosed, in accordance with various embodiments. The wearable passive exoskeleton device comprises a leg exoskeleton frame configured to be worn around a leg of a user, and a lever arm rotatably coupled to the leg exoskeleton frame so as to provide a handle for the user to move between a sitting position and a standing position, the lever arm being rotatable between a stowed position and a deployed position.

In various embodiments, the wearable passive exoskeleton device further comprises a ratcheting pivot whereby the lever arm is rotatably mounted to the leg exoskeleton frame, wherein the lever arm is configured to rotate with respect to the leg exoskeleton frame in a first rotational direction from the stowed position to the deployed position. In the deployed position, the ratcheting pivot locks the lever arm from rotating with respect to the leg exoskeleton frame in a second rotational direction to transfer a user's push or pulling force to the ground, wherein the second rotational direction is opposite to the first rotational direction.

In various embodiments, the wearable passive exoskeleton device further comprises a first leg attachment coupled to a first end of the leg exoskeleton frame and configured to wrap around the user's leg, and a second leg attachment coupled to a second end of the leg exoskeleton frame and configured to wrap around the user's leg. The leg exoskeleton frame is worn around the user's leg via the first leg attachment and the second leg attachment.

In various embodiments, the first leg attachment is configured to be worn between a thigh of the user and a calf of the user. In various embodiments, the second leg attachment is configured to be worn around an ankle of the user. In various embodiments, the wearable passive exoskeleton device further comprises a cushioned kneepad coupled to the leg exoskeleton frame via the first leg attachment. In various embodiments, the wearable passive exoskeleton device further comprises a foot attachment configured to be placed at least partially over a foot of the user.

In various embodiments, the foot attachment is coupled to the leg exoskeleton frame via a ball joint. In various embodiments, the foot attachment wraps around the back of the user's foot. In various embodiments, the foot attachment extends over the top of the user's foot. In various embodiments, the leg exoskeleton frame comprises a first tube coupled to a second tube via a first bracket and a second bracket, wherein the lever arm is pivotally coupled to the first bracket, and the foot attachment is coupled to the second bracket.

In various embodiments, the lever arm is a telescoping lever arm comprising a telescoping rod configured to extend and retract with respect to a first rod to vary an overall length of the lever arm.

In various embodiments, the wearable passive exoskeleton device further comprises a first stopper configured to stop the lever arm from rotating from the first deployed position to the stowed position, and a second stopper configured to stop the lever arm from rotating from the stowed position to the first deployed position while the user is moving.

A wearable passive exoskeleton for sit-to-stand transfer is disclosed, in accordance with various embodiments. The wearable passive exoskeleton comprises a leg exoskeleton frame configured to be coupled to a human leg, and a unidirectional lever arm rotatably coupled to the leg exoskeleton frame and configured to rotate from a stowed position, wherein the lever arm is substantially parallel with the human leg, to a deployed position so as to provide a handle for the user to move from a sitting position to a standing position, wherein the lever arm is configured to rotate only in a single rotational direction.

In various embodiments, the wearable passive exoskeleton further comprises a cushioned kneepad coupled to the leg exoskeleton frame. In various embodiments, the lever arm is configured to rotate in a rotational direction from the stowed position to the deployed position, and the lever arm is configured to rotate in the same rotational direction from the deployed position to the stowed position. In various embodiments, the leg exoskeleton frame comprises an upper-most bracket and a lower-most bracket, wherein the lever arm is pivotally coupled to the upper-most bracket. In various embodiments, the leg exoskeleton frame further comprises a foot attachment pivotally coupled to the lower-most bracket. In various embodiments, the leg exoskeleton frame further comprises a first tube and a second tube each extending from the upper-most bracket to the lower-most bracket. In various embodiments, the leg exoskeleton frame is configured to extend substantially parallel to the user's leg.

A method for operating a passive exoskeleton is disclosed, in accordance with various embodiments. The method comprises rotating a lever arm in a first rotational direction with respect to a leg exoskeleton frame from a stowed position to a deployed position, applying a force on the lever arm in a second rotational direction, stopping the lever arm from rotating in the second rotational direction while the force is applied to the lever arm, and transmitting an assisting force through the passive exoskeleton (and through the user's leg) and into the ground.

In various embodiments, the method further comprises rotating the lever arm in the first rotational direction with respect to the leg exoskeleton frame from the deployed position to the stowed position. In various embodiments, the lever arm is stopped from rotating in the second rotational direction by a ratcheting pivot coupled between the lever arm and the leg exoskeleton frame.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

With reference to the following description and accompanying drawings.

DETAILED DESCRIPTION

Figure 1:
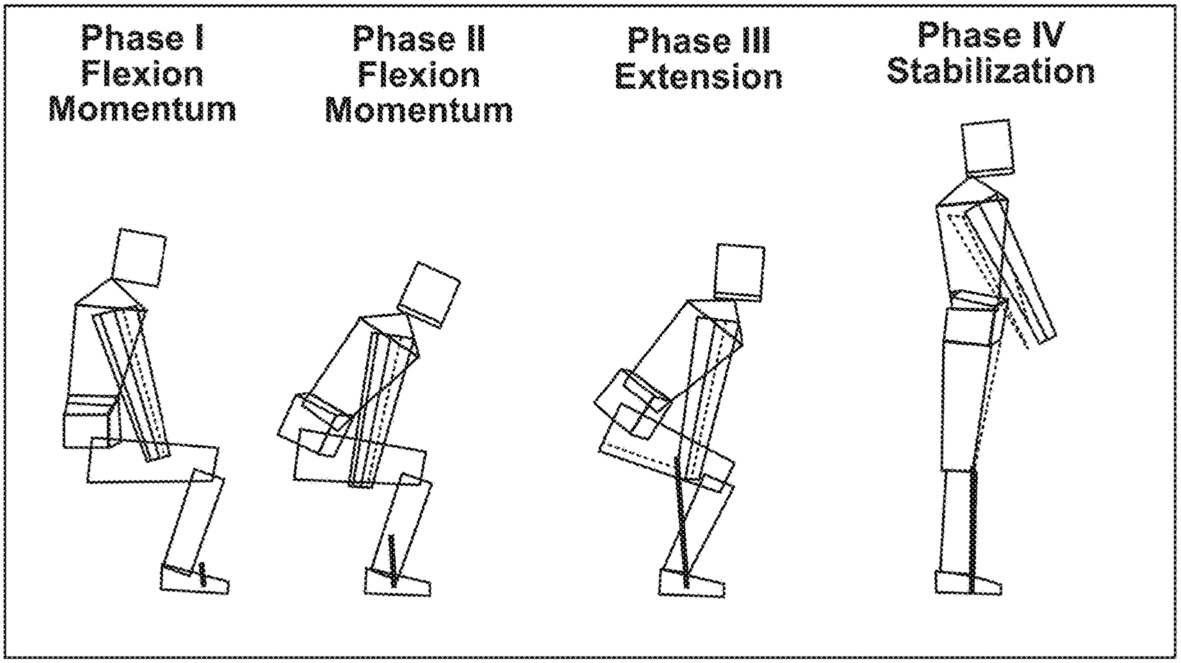
FIG. 1 illustrates four major steps to successfully move from a sitting to a standing position.

The following description is of various exemplary embodiments only, and is not intended to limit the scope, applicability or configuration of the present disclosure in any way. Rather, the following description is intended to provide a convenient illustration for implementing various embodiments including the best mode. As will become apparent; various changes may be made in the function and arrangement of the elements described in these embodiments without departing from principles of the present disclosure.

For the sake of brevity, conventional techniques and components for wearable robotic systems may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary passive exoskeleton systems and/or components thereof.

A passive exoskeleton device of the present disclosure may include a simple attachment that can be connected to any existing footwear (e.g., a sneaker, sandal, boot, or the like). This allows the device to be used for brief or extended periods of time. To sit or stand, there is a unidirectional lever atm that provides support for the user, relieving strain on their weak knees or legs. For example, if a person wants to be able to walk around, sit down, and stand up multiple times, they can do so simply, quickly, and effortlessly without straining their knees (e.g., see FIG. 1). A passive exoskeleton device of the present disclosure provides a design for a passive device to allow a person who tends to have difficulty getting up—or a person who often maneuvers between these two positions—to have the ability to quickly use their upper body strength to hoist or push themselves up effectively with limited strain on their lower body joints.

A passive exoskeleton of the present disclosure may assist humans in rising from the ground, sitting, or lying down (e.g., off the ground, out of a chair, bed, etc.). A passive exoskeleton of the present disclosure may provide an affordable passive exoskeleton to be used universally in both industrial and household situations. By developing a device that accomplishes these goals, humans with impaired lower-body strength or knee joints will be able to resume daily activities, extend their tenure in the workforce, and successfully complete manual labor tasks that were previously not possible due to their inability to lift themselves.

A passive exoskeleton of the present disclosure may include a frame constructed from two lightweight, durable tubes connected via several custom brackets. The brackets may be made of highly durable, lightweight plastic; though in accordance with various embodiments the brackets may also be made of metal, metal alloys, or composite materials. Other frame constructions are contemplated herein, for example a single-piece frame made from a lightweight composite material. At the top of the passive exoskeleton, a unidirectional lever arm mechanism is attached to the frame, Two lightweight and comfortable straps may secure the frame to the leg. The device is then connected at the ankle via a clip-on shoe attachment. A flexible joint may be added to the ankle to allow for normal movement and providing full mobility.

With reference now to FIG. 1, various phases of a person moving from a sitting to a standing position are illustrated. When getting off of a chair, there are four major steps to successfully move from a sitting to a standing position: i) flexion momentum, ii) momentum transfer, iii) extension, and iv) stabilization. In order to do this, one must lift themselves up using their legs, specifically, the quadriceps, hamstrings, and glutes. A surface is required for the average person with weak or damaged muscles to either pull themselves up or push against the surface. This is extremely common in elderly individuals and workers who are constantly working on their knees, which develops over time.

Figure 2A:
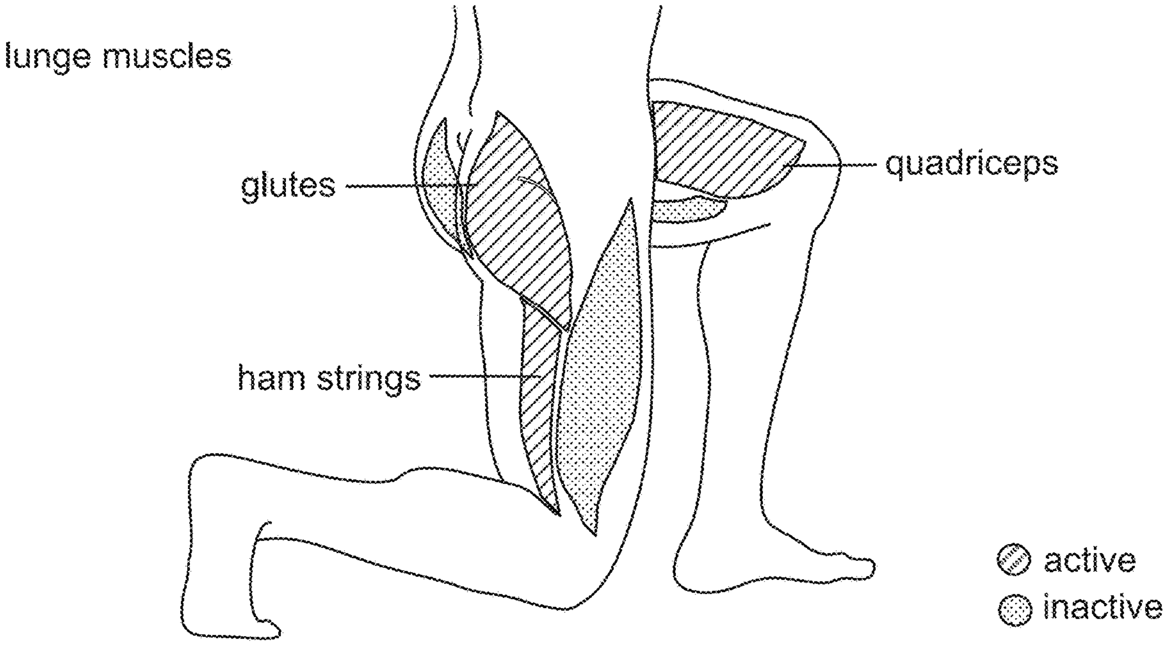
FIG. 2A illustrates active and inactive muscles of a person getting up off the floor.
Figure 2B:
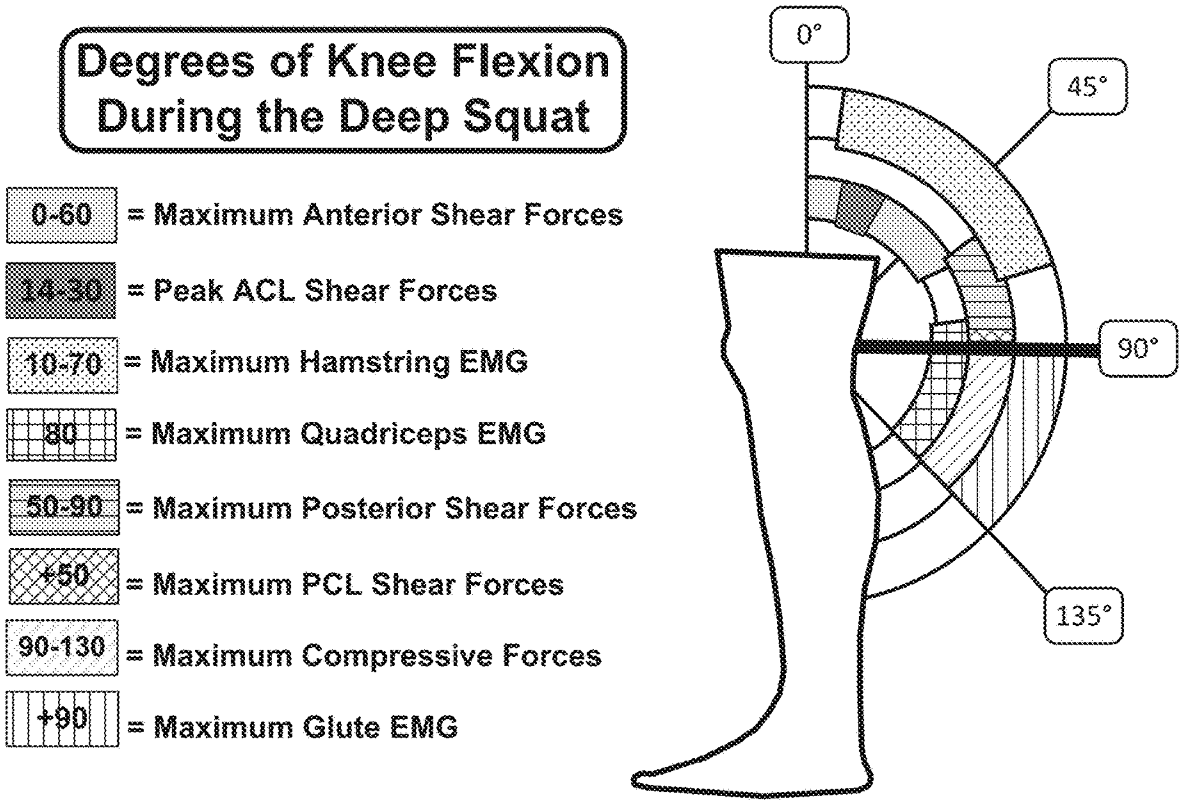
FIG. 2B illustrates degrees of knee flexion during a deep squat.

With reference now to FIG. 2A, active and inactive muscles of a person getting up off the floor are illustrated. With reference to FIG. 2B, degrees of knee flexion during a deep squat are illustrated. With combined reference to FIG. 2A and FIG. 2B, when rising from the ground, the simplest way is generally to get up from being on one knee, but this may still be a struggle due to weak glutes and quadriceps due to extensive PCL (Posterior Cruciate Ligament) shear and compression forces.

Discussions were had with human beings over the age of 70 who have claimed to have one or more issues with sit-to-stand transfer from chair or ground level, as well as with younger workers in demanding fields that require them to repeatedly work on the ground or on their knees for extended periods of time. Firstly, it was discovered that many leg and foot exoskeletons connect at the bottom and or the sole of the shoe, allowing to transfer forces directly to the ground. This current method tends to be problematic and could increase slips, trips, and/or falling injuries. As a result, in order to reduce the risk of injury, it is desirable for the device to connect to the top or side of the shoe and transfer energy to the ground. Second, it was discovered that pushing oneself up is more effective than lifting oneself up entirely with one's legs. This happens because the muscles in the knee tend to stretch out over time, making the leg and knee muscles weaker than the elbow and arm muscles.

Similarly, sitting or lowering oneself to the floor (i.e., stand-to-sit/ground level transfer) tends to produce the same, if not worse, results. When sitting, people with weaker knee or leg muscles are more likely to fall into a chair, bed, or couch rather than gently sitting down. This can result in numerous injuries because the knees can give out, making the task extremely difficult. For people with similar issues, this makes it nearly impossible to drop to the floor without falling. Oftentimes a solution to this problem is finding items or surfaces to grab onto, which can alleviate this problem. Unfortunately, surfaces to grab onto near a chair, bed, couch, or floor may not be available in every location.

Wearable exoskeleton systems are known to assist people who have been injured or are used to prevent injuries from happening at home and/or in the workplace, One exemplary use of principles disclosed herein is to assist those who have not been diagnosed with knee or leg muscle injuries, but still, have trouble getting up off the ground or from a chair or related surfaces. There are a significant number of people who have this issue due to aging, obesity, small-scale injuries, and even simply from completing tasks using their legs repeatedly. The passive exoskeletons of the present disclosure are designed to alleviate muscle and knee strain when standing and sitting.

In various embodiments, a passive exoskeleton of the present disclosure allows the user to walk and maneuver freely, while being able to briskly sit and stand. In various embodiments, a passive exoskeleton of the present disclosure assists the user so as to reduce knee forces and increases the user's stamina. In various embodiments, a passive exoskeleton of the present disclosure enhances the efficiency for aging and older members of the workforce. In various embodiments, a passive exoskeleton of the present disclosure improves quality of life by allowing aging users to have more control of their body.

Figure 3:
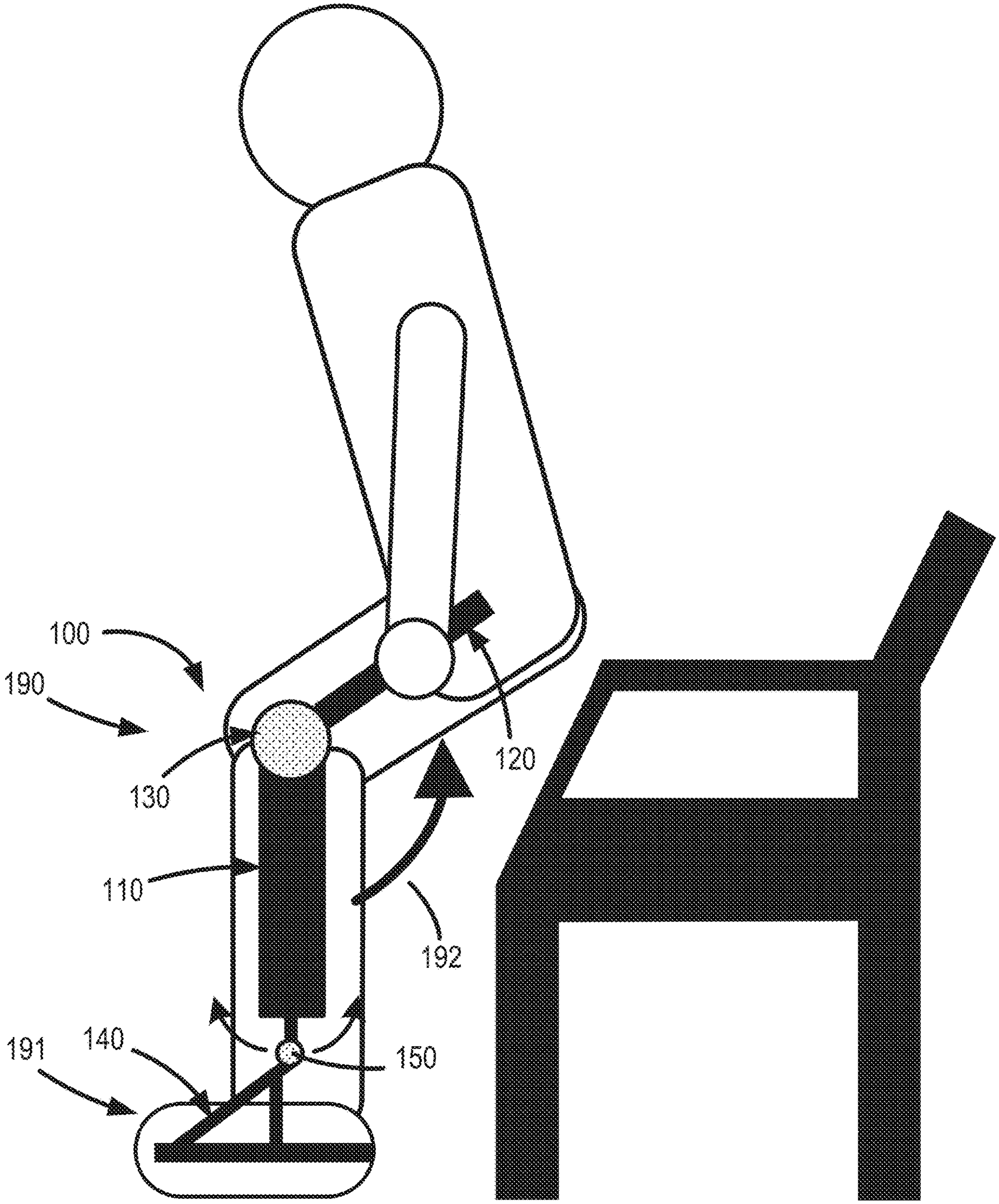
FIG. 3 schematically illustrates an exemplary passive exoskeleton system in use, in accordance with various exemplary embodiments of the present disclosure.

With reference now to FIG. 3, an exemplary passive exoskeleton 100 is schematically illustrated in accordance with various embodiments. In the illustrated embodiment, passive exoskeleton 100 is shown being used during a stand-to-sit movement; however, it will become apparent herein that passive exoskeleton 100 may also be used for other movements such as sit-to-stand or kneel-to-stand movements. Passive exoskeleton 100 is a device which can assist a wearer's knees by allowing the wearer to use their upper body strength to move from a sitting position to a standing position. In this regard, passive exoskeleton 100 may be referred to herein as a sit-to-stand exoskeleton. Passive exoskeleton 100 is a device which can assist a wearer's knees by allowing the wearer to use their upper body strength to move from a standing position to a sitting position. In this regard, passive exoskeleton 100 may be referred to herein as a stand-to-sit exoskeleton. Moreover, passive exoskeleton 100 can assist a wearer's knees by allowing the wearer to use their upper body strength to move from a kneeling position to a standing position. In this regard, passive exoskeleton 100 may be referred to herein as a "kneel-to-stand" exoskeleton. In this regard, although passive exoskeleton 100 is referred to herein using terms "sit-to-stand" and "stand-to-sit," it should be understood that passive exoskeleton 100 is capable of more than just sit-to-stand or just stand-to-sit assistance.

Passive exoskeleton 100 may include a leg exoskeleton frame 110 and a lever arm 120 rotatably coupled to the frame 110. The leg exoskeleton frame 110 may be configured to be worn around the user's leg, with the leg exoskeleton frame 110 and the lever arm 120 located at the lateral (or outer) side of the leg. In various embodiments, the leg exoskeleton frame 110 extends parallel to the user's leg, for example, between and to the user's knee and the user's ankle. More particularly, the leg exoskeleton frame 110 may generally extend adjacent and along the user's fibula. The lever arm 120 may be pivotally coupled to the upper portion 190 of the frame 110, for example at a pivot 130, In the deployed position, the lever arm 120 may rotate about pivot 130 away (represented by arrow 192) from the lower end 191 of the frame 110. In the stowed position, the lever arm 120 may rotate about pivot 130 downwardly to a parallel configuration with the frame 110. In the stowed position, the lever arm 120 may rotate about pivot 130 downwardly to a parallel configuration with the user's leg. The total length of lever arm 120 may be between 75% and 110% of the total length of frame 110 in various embodiments, between 80% and 100% of the total length of frame 110 in various embodiments, and between 90% and 100% of the total length of frame 110 in various embodiments. In various embodiments, lever arm 120 may be telescoping to provide the user with extra leverage when moving between and to kneeling, sitting, and standing positions (see FIG. 13 through FIG. 14B).

A foot attachment 140 (also referred to herein as a shoe attachment or a foot/shoe attachment) may be coupled to the lower end 191 of the frame 110, whereby the leg exoskeleton frame 110 is pivotally coupled to a user's foot. The foot attachment 140 may wrap around the heel of the user, in various embodiments. The foot attachment 140 may wrap around the top of the user's foot, in various embodiments. Foot attachment 140 may be pivotally coupled to frame 110 via a joint 150, such as a ball joint or the like. Joint 150 may allow for multi-axial rotation of foot attachment 140 with respect to frame 110 to increase comfortability and maneuverability of the foot attachment 140.

In various embodiments, passive exoskeleton 100 may be a portable, lightweight, small-profile, passive leg exoskeleton which supports the legs, knees, and feet by providing a load path for a user to maneuver to either a lower sitting position or a higher standing position. For some people, their weaker lower body must be assisted by the arms of their upper body which assist the knees and legs when moving from a sitting-to-standing or standing-to-sitting position.

Desirable features of a passive leg exoskeleton include the following: 1) the device should weigh less than 1 lb. and be small enough to fit in a small bag or purse; 2) the leg structure will support the knee when extending to the sit & stand position; 3) the device is a passive mechanism, allowing increased affordability; 4) when the user is moving from a standing to a sitting position or sitting to a standing position, the user's weight will be transferred using muscles from their upper and lower body; 5) there will be a ball joint to provide flexion/extension, inversion/eversion, and added comfort at the ankle; 6) the system will easily attach at one point to any existing shoe including, but not limited to sandals, sneakers, and work boots; 7) a hazard study will be performed and all snag hazards, pinch points etc. will be removed; and 8) the device can be worn on both the left and right legs for the best support. A passive exoskeleton of the present disclosure, in accordance with various embodiments, satisfies each of these desired features.

Figure 4A:
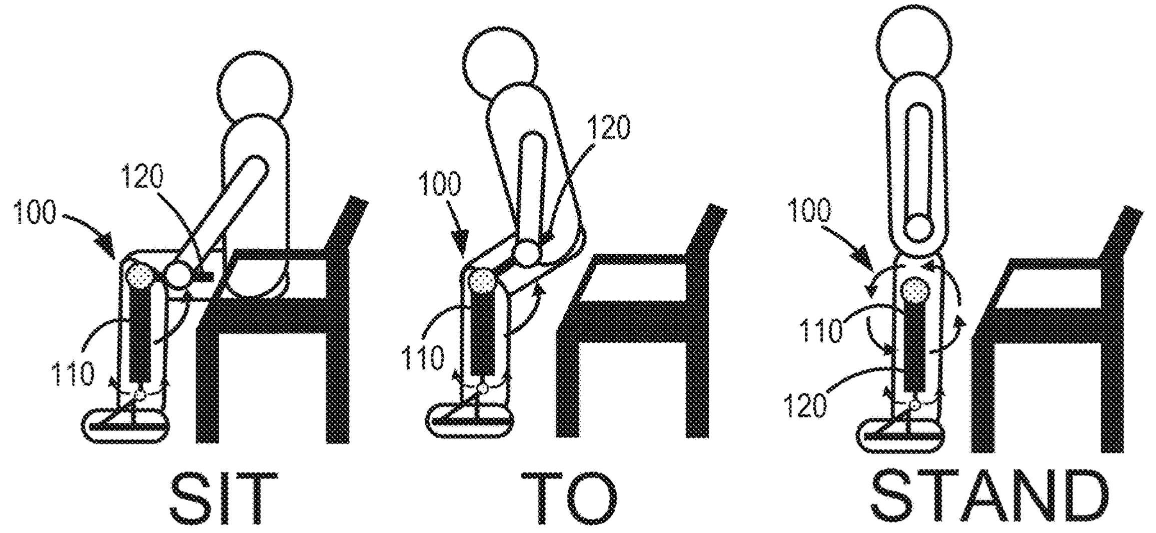
FIG. 4A schematically illustrates an exemplary passive exoskeleton of the present disclosure in use during a sit-to-stand movement, in accordance with various exemplary embodiments of the present disclosure.
Figure 4B:
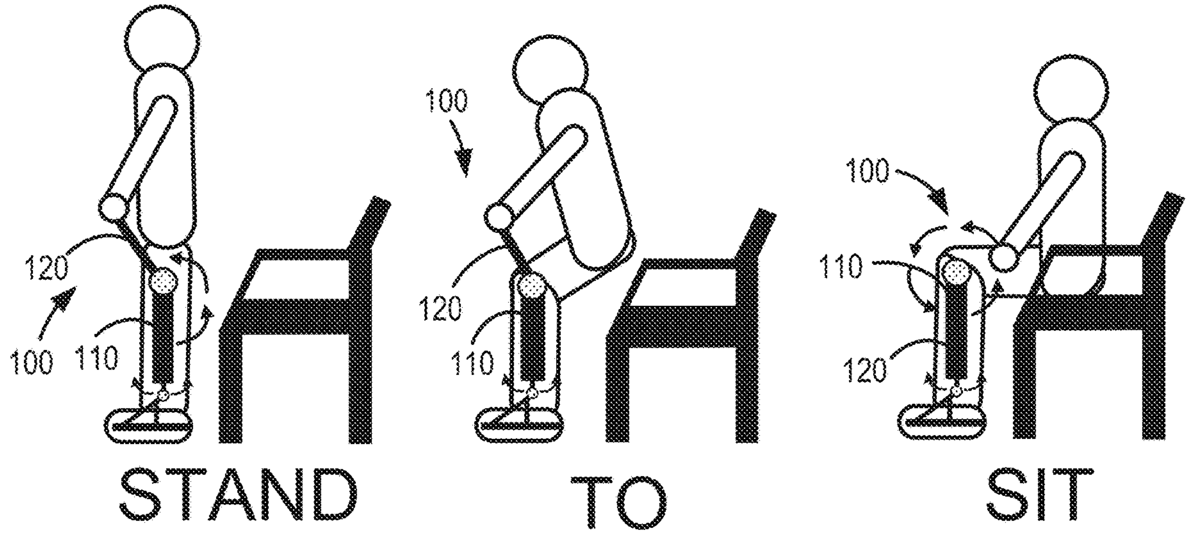
FIG. 4B schematically illustrates stand-to-sit movement device use diagrams in accordance with various exemplary embodiments of the present disclosure.

With reference to FIG. 4A and FIG. 4B, sit-to-stand and stand-to-sit movement device use diagrams, respectively, are illustrated, in accordance with various embodiments. The passive exoskeleton 100 allows for sit-to-stand transfer as well as stand-to-sit transfer through the same mechanism. The illustrated diagrams show how the passive exoskeleton 100 can be manipulated for these purposes.

As illustrated in FIG. 4A, the user adjusts the lever arm 120 to a comfortable position and pushes downward to assist standing. The user can then lift the lever arm 120 as they are standing to a desirable height and continue pushing down if additional support is needed. Once in a standing position, the lever arm 120 is rotated into a final position so that it is tucked away.

As illustrated in FIG. 4B, the user adjusts the lever arm 120 to a comfortable position and pulls on it, resulting in a resistive force to lower themselves gently downward into the chair. Once sitting, the lever arm 120 is rotated into a final position so that it is tucked away. If the user prefers to push down rather than pull as they prepare to sit from a standing position (e.g., the reverse of FIG. 4A), they are free to do so.

Figure 5:
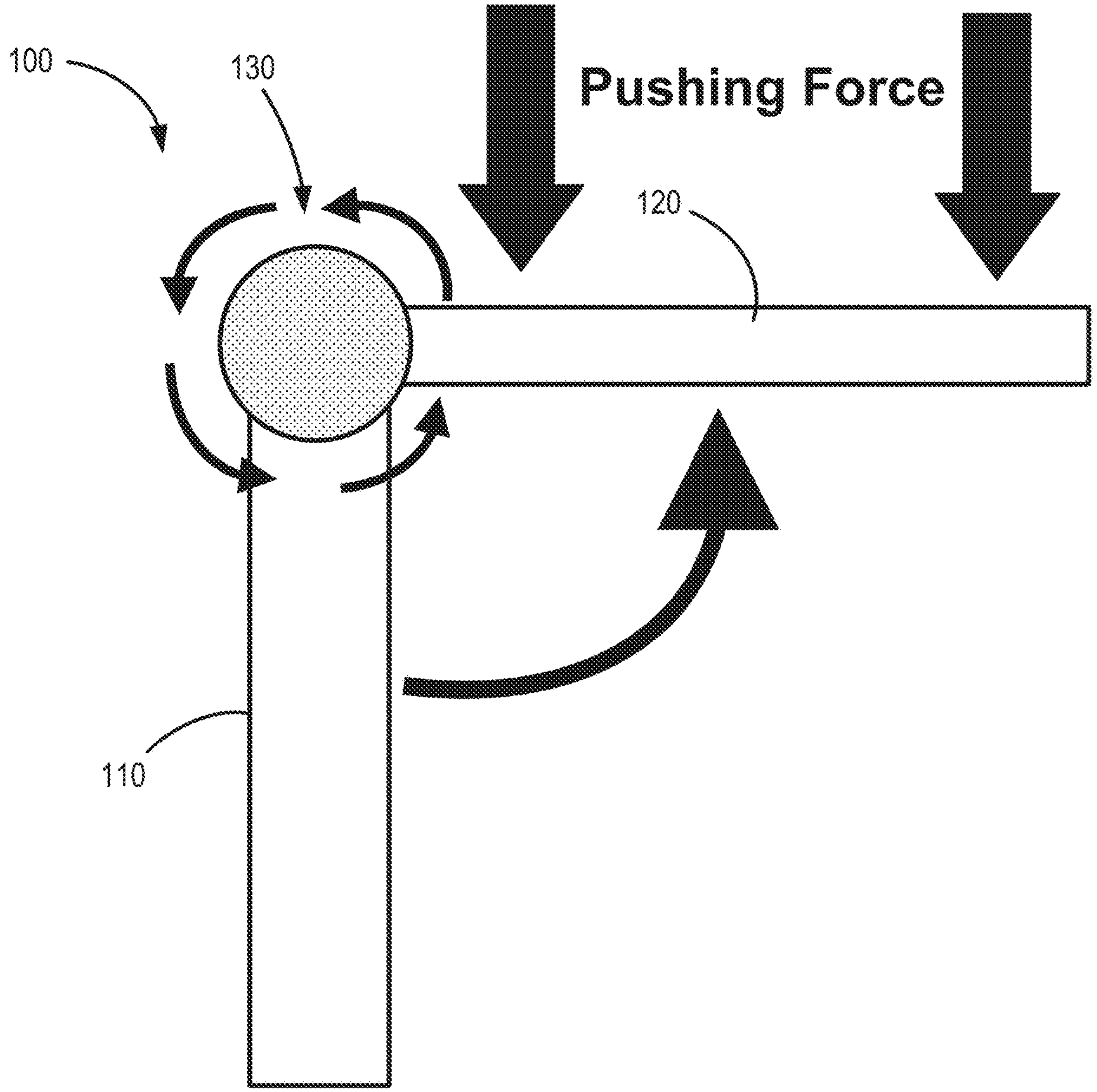
FIG. 5 schematically illustrates components of an exemplary passive exoskeleton of the present disclosure including a lever arm, in accordance with various exemplary embodiments of the present disclosure.

With reference to FIG. 5, passive exoskeleton 100 may utilize a lever concept to allow the user one-directional motion providing lever arm 120 to transfer the user's mass and assist in getting up from a sitting, kneeling, or lying down position (e.g., out of a chair, bed, couch, or off of the ground). In various embodiments, passive exoskeleton 100 includes leg exoskeleton frame 110 and lever arm 120 rotatably coupled to the frame 110 with a ratcheting pivot 130 that allows the lever arm 120 to rotate in a first rotational direction (e.g., counter-clockwise in FIG. 5) and locks the lever arm 120 from rotating in a second opposite rotational direction (e.g., clockwise in FIG. 5) to transfer a user's weight to the ground. In this regard, ratcheting pivot 130 may include a locking lever that blocks lever arm 120 from rotating in the second rotational direction. In this manner lever arm 120 is rotatable between a stowed position (e.g., see the standing position in FIG. 4A and/or the siting position in FIG. 4B), wherein the lever arm 120 folds in closed relationship to (e.g., folds against) the frame 110, and a deployed position (see FIG. 5), wherein the lever arm 120 extends away from frame 110.

Figure 6:
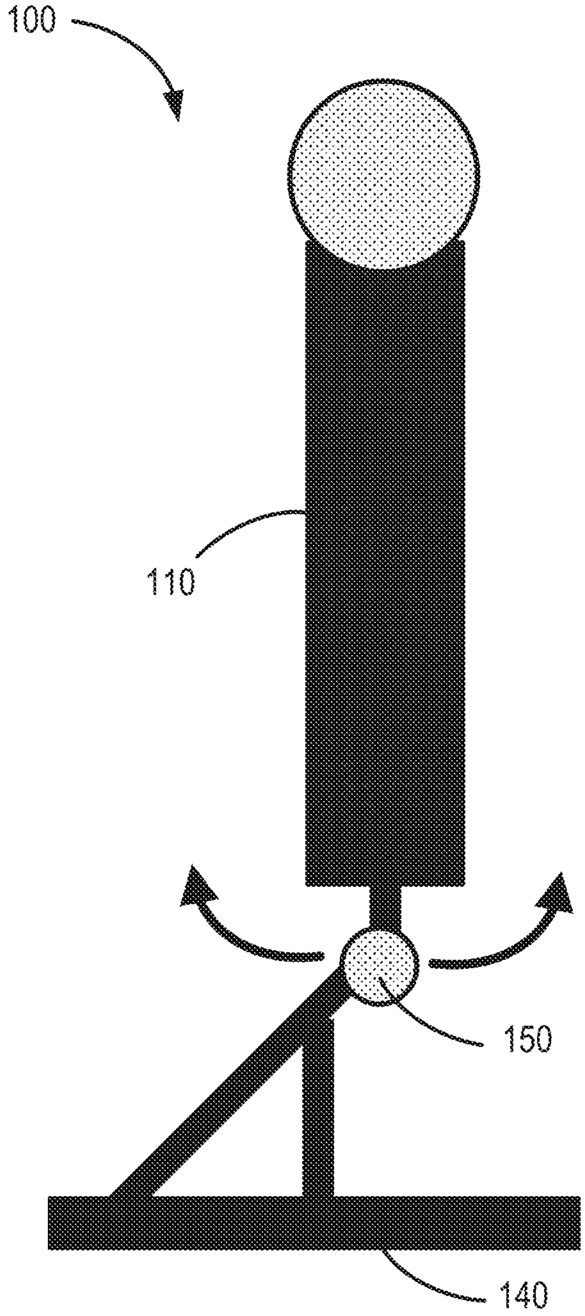
FIG. 6 schematically illustrates components of an exemplary passive exoskeleton of the present disclosure including an ankle joint, in accordance with various exemplary embodiments of the present disclosure.

With reference to FIG. 6, passive exoskeleton 100 may utilize a joint concept to allow 180° movement in all directions at the ankle. This will allow full mobility of the user's ankle and a place where force will be transferred perpendicular to the ground. In this regard, joint 150 may be a ball joint or other type of joint that allows for multi-axial rotation.

In various embodiments, a passive exoskeleton 100 of the present disclosure utilizes a default position that hides passive lever am) 120, so it is out of the way to allow for long-term use. Lever arm 120 may provide 360° of unidirectional rotation to allow the user to pull or push themselves up (or down). A passive exoskeleton 100 of the present disclosure may utilize an ankle joint mechanism (e.g., joint 150 and foot attachment 140) to allow for flexion-extension. A passive exoskeleton 100 of the present disclosure may allow for quick attachment and release to any shoe including sneakers, boots, sandals, and more.

Figure 7:
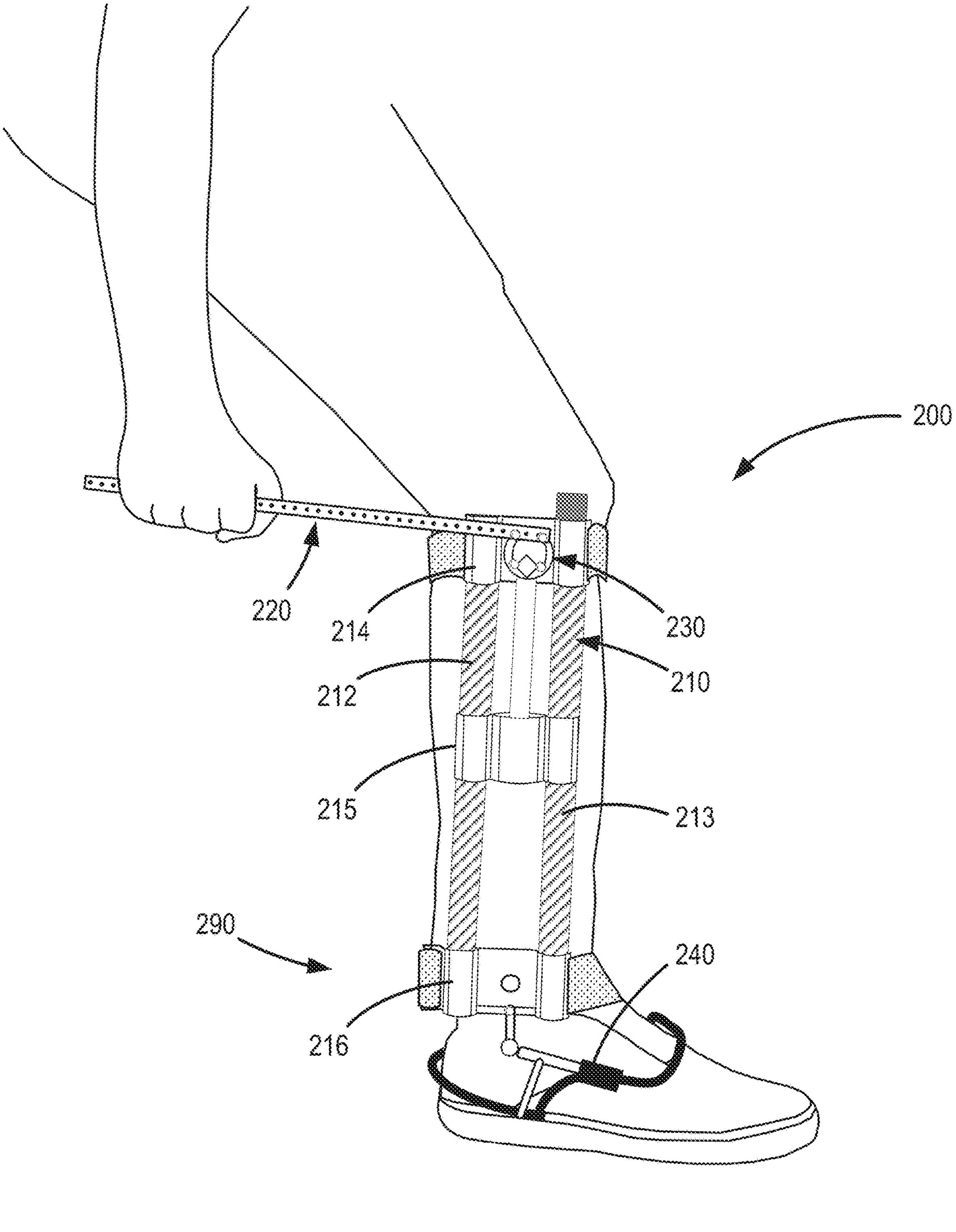
FIG. 7 illustrates an exemplary passive exoskeleton in use; in accordance with various exemplary embodiments of the present disclosure.

With reference now to FIG. 7, an exemplary passive exoskeleton 200 is illustrated, in accordance with various embodiments. Passive exoskeleton 200 may operate similar to passive exoskeleton 100 as described herein in accordance with various embodiments. Passive exoskeleton 200 may include a leg exoskeleton frame 210 and a lever am) 220 rotatably coupled to the frame 210. The leg exoskeleton frame 210 may include a first tube 212 and a second tube 213, and two or more brackets (e.g., first bracket 214, second bracket 215, and third bracket 216) coupled between the first tube 212 and the second tube 213. For example, the illustrated embodiment shows three brackets 214, 215, and 216 extending between longitudinally extending tubes 212 and 213; though in various embodiments more or less brackets may be used and/or more or less tubes may be used. The lever arm 220 may be pivotally coupled to the top-most bracket 214. In the deployed position, the lever arm 220 may rotate away from the lower end 290 of the frame 210. In the stowed position, the lever arm 220 may rotate downwardly to a parallel configuration with the frame 210 (e.g., parallel to the tubes). A foot attachment 240 may be coupled to the bottom-most bracket 216, whereby the leg exoskeleton frame 210 is pivotally coupled to a user's foot. The foot attachment 240 may wrap around the heel of the user, in various embodiments. The foot attachment 240 may wrap around the top of the user's foot, in various embodiments.

Figure 8:
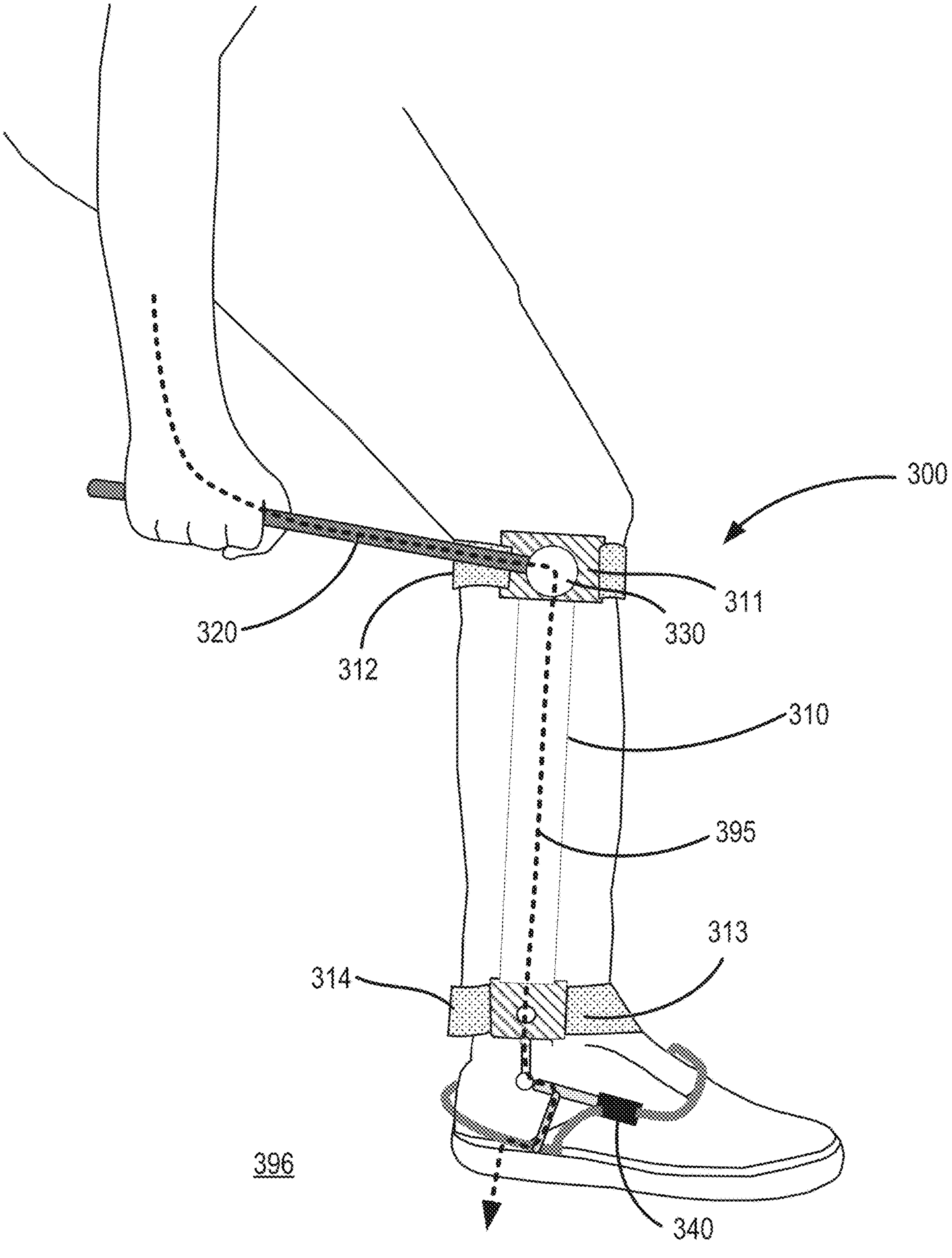
FIG. 8 illustrates an exemplary passive exoskeleton system in use; in accordance with various exemplary embodiments of the present disclosure.

With reference to FIG. 8, an exemplary passive exoskeleton 300 is illustrated in accordance with an exemplary embodiment. Passive exoskeleton 300 may operate similar to passive exoskeleton 100 as described herein in accordance with various embodiments. Passive exoskeleton 300 may include a leg exoskeleton frame 310. Leg exoskeleton frame 310 may be configured to be attached to a user's leg with a first (e.g., upper) leg attachment 312 and a second (e.g., lower) leg attachment 314. The first and second leg attachments 312, 314 may be configured to wrap around the user's leg. The first and second leg attachments 312, 314 may be configured to cinch around the user's leg. The first and second leg attachments 312, 314 may be configured to wrap around the user's leg. While the second leg attachments 314 is described herein as being secured around the user's leg, it should be understood that the second leg attachment 314 may be wrapped around the user's ankle, without departing from the scope of the present disclosure. As used in this context, a user's "leg" is meant to include the user's "ankle." In this regard, second leg attachment 314 may be located on one of or between the user's foot and the user's calf muscle, while the first leg attachment 312 may be located on one of or between the user's calf muscle and the user's thigh. In various embodiments, the first leg attachment 312 is located at or just below the user's knee. In various embodiments, the first and second leg attachments 312, 314 may include a strap or other flexible harness for securing exoskeleton frame 310 to the user's leg. Leg exoskeleton frame 310 may be made from a fiber-reinforced composite material (e.g., carbon fiber). Leg exoskeleton frame 310 may be formed as an extruded rectangular flat plate.

Leg exoskeleton frame 310 may extend between a first bracket 311 and a second bracket 313. In various embodiments, first bracket 311 and/or second bracket 313 is removably coupled to the leg exoskeleton frame 310. In various embodiments, first bracket 311 and/or second bracket 313 is integrally coupled to the leg exoskeleton frame 310 (e.g., first bracket 311 and/or second bracket 313 and the leg exoskeleton frame 310 may be formed as a single piece and/or as a monolithic structure). Lever arm 320 may be coupled to leg exoskeleton frame 310 via the first bracket 311. First leg attachment 312 may be coupled to leg exoskeleton frame 310 via the first bracket 311. A foot attachment 340 may be coupled to the leg exoskeleton frame 310 via the second bracket 313. Foot attachment 340 may be pivotally coupled to second bracket 313. Foot attachment 340 may be pivotally coupled to a user's foot. The foot attachment 340 may wrap around the heel of the user, in various embodiments. The foot attachment 340 may wrap around the top of the user's foot, in various embodiments.

In various embodiments, the lever arm 320 may be unidirectional lever arm or may be a bidirectional lever arm. In an exemplary embodiment, the lever arm 320 is a bidirectional lever arm e.g., free to rotate in either the clockwise or counter-clockwise direction) and may be stopped from rotation at one or more predetermined rotational positions to provide a stationary handle for pushing and/or pulling to assist a user in standing and/or sitting. In this manner, the lever arm 320 may be configured to rotate in a first rotational direction from the stowed position to the deployed position, and the lever arm 320 may be configured to rotate in a second, opposite rotational direction from the deployed position to the stowed position.

Figure 9A:
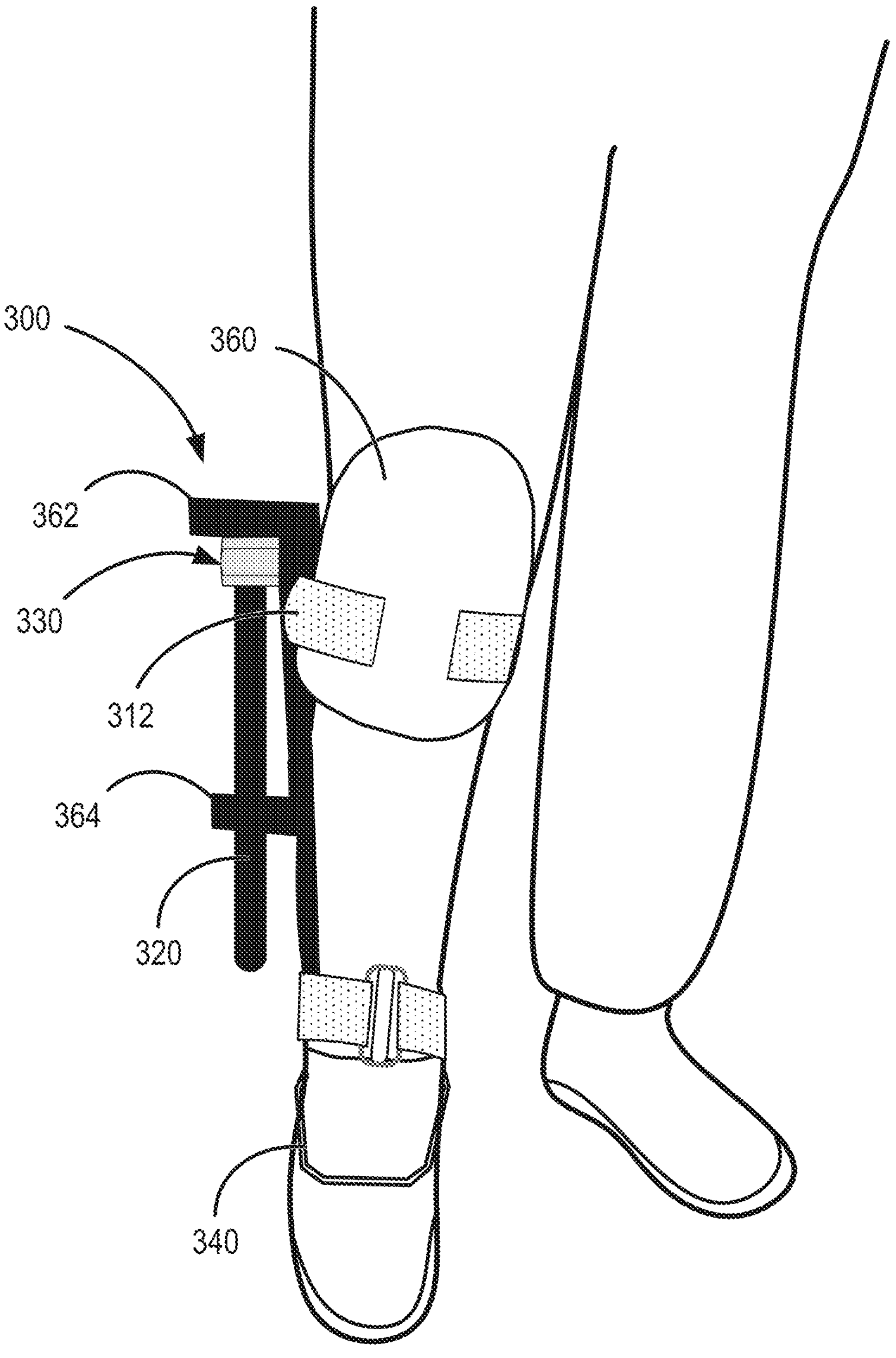
FIG. 9A illustrates a front view of an exemplary passive exoskeleton system installed on a user's leg and including a knee pad, in accordance with various exemplary embodiments of the present disclosure.
Figure 9B:
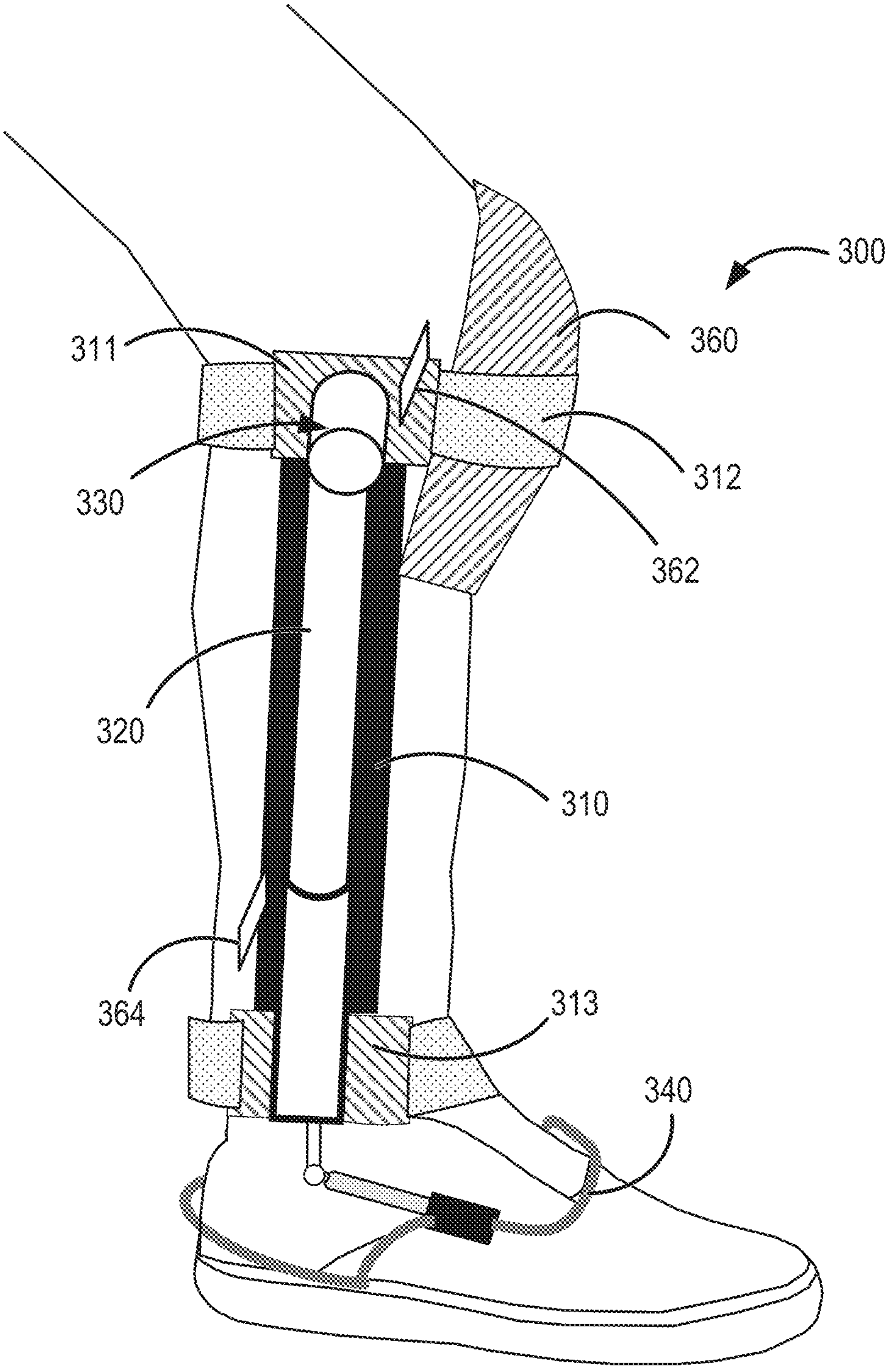
FIG. 9B illustrates a side view of the exemplary passive exoskeleton system of FIG. 9A, in accordance with various exemplary embodiments of the present disclosure.

In an exemplary embodiment, the lever arm 320 is a unidirectional lever arm (e.g., free to rotate in the clockwise direction as viewed in FIG. 8 or FIG. 9B) and may be stopped from rotating in the counter-clockwise direction via a ratcheting pivot 330 at one or more predetermined rotational positions to provide a stationary handle for pushing and/or pulling to assist a user in standing and/or sitting. For example, a user may rotate the lever arm 320 from approximately the Six O'clock position (e.g., downward extending; see for example FIG. 9A) to approximately the Nine O'clock position (e.g., rearward extending; see for example FIG. 8) at which point a user may push downward on the lever arm 320 to assist the user from a seated position to a standing position. As the user pushes downward on the lever arm 320, the lever arm 320 may be stopped from rotating in the counter-clockwise direction by the ratcheting pivot 330. The user may rotate the lever arm 320 in the clockwise direction to approximately the Two O'clock position at which point a user may pull on the lever arm 320 to safely assist the user from a standing position to a seated position. In this manner, the likelihood of the user falling into the chair/seating area is minimized. As the user pulls on the lever arm 320, the lever arm 320 may be stopped from rotating in the counter-clockwise direction by the ratcheting pivot 330.

In various embodiments, and with momentary reference to FIG. 9A, passive exoskeleton 300 may include a first stopper 362 configured to engage the lever arm 320 to prevent rotation of the lever arm 320 in a first rotational direction (e.g., the clockwise direction as viewed in FIG. 9B) when the lever arm 320 is deployed. In this regard, a user may move lever arm 320 to the deployed position and the first stopper 362 may stop the lever arm 320 from falling to the stowed position when the user lets go of the lever arm 320. With the lever arm 320 in contact with the first stopper 362, a user may exert a rotational force on the lever arm 320 to rotate the lever arm 320 past the first stopper 362 toward the stowed position. For example, first stopper 362 may be made from a flexible plastic or rubber material configured to flex in response to a user exerting a force on the first stopper 362. Passive exoskeleton 300 may further include a second stopper 364 configured to engage the lever arm 320 to prevent rotation of the lever arm 320 in the first rotational direction (e.g., the clockwise direction as viewed in FIG. 9B) when the lever arm 320 is stowed. For example, second stopper 364 may stop the lever arm 320 from rotating in the first rotational direction as the user is walking so that the lever arm 320 does not inadvertently deploy. As desired, the user may exert a force on the lever arm 320 to rotate the lever arm 320 past the second stopper 364 toward a deployed position. For example, second stopper 364 may be made from a flexible plastic or rubber material configured to flex in response to a user exerting a force on the second stopper 364, thereby allowing the lever arm 320 to rotate past the second stopper 364. In this manner, lever arm 320 may be stopped from rotating with respect to frame 310 as the user is walking or otherwise moving. In this regard, the lever arm 320 may be configured to rotate in the first rotational direction from the stowed position to the deployed position, and the lever arm 320 may be configured to rotate in the (same) first rotational direction from the deployed position to the stowed position. In this manner, first and second stopper 362, 364 may be stiff enough to stop the lever arm 320 from unintentional rotation, but flexible enough that the user may overcome the stopping force of the first and second stopper 362, 364 when the user desires to stow or deploy, respectively, the lever arm 320.

With reference now to FIG. 9A and FIG. 9B, passive exoskeleton 300 is illustrated with a cushioned kneepad 360. In an exemplary embodiment, the kneepad 360 is coupled to the first leg attachment 312. For example, first leg attachment 312 may extend over and/or through at least a portion of the kneepad 360. Kneepad 360 may provide cushioning to the user's knee to improve comfort of the passive exoskeleton 300.

Figure 10:
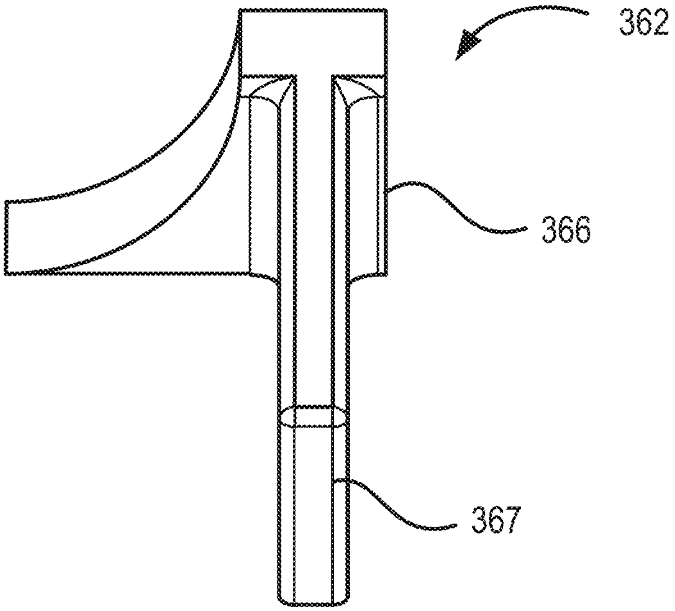
FIG. 10 illustrates a side view of an exemplary upper stopper, in accordance with various exemplary embodiments of the present disclosure.

With reference to FIG. 10, first stopper 362 is illustrated. First stopper 362 may be shaped to provide added comfort to the user. First stopper 362 may comprise a base portion 366 configured to be coupled to the first bracket 311 (see FIG. 9B) and a flexible extension 367 configured to contact the lever arm 320 (see FIG. 9B).

Figure 11:
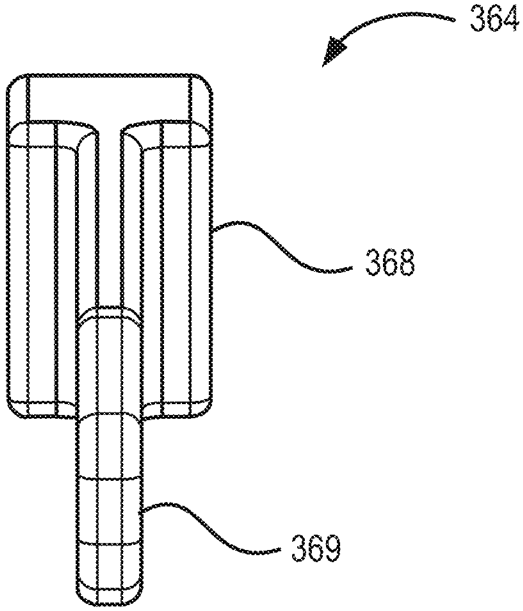
FIG. 11 illustrates a side view of an exemplary lower stopper, in accordance with various exemplary embodiments of the present disclosure.

With reference to FIG. 11, second stopper 364 is illustrated. Second stopper 364 may, comprise a base portion 368 configured to be coupled to the leg exoskeleton frame 310 and/or the second bracket 313 (see FIG. 9B) and a flexible extension 369 configured to contact the lever arm 320 (see FIG. 9B).

Figure 12:
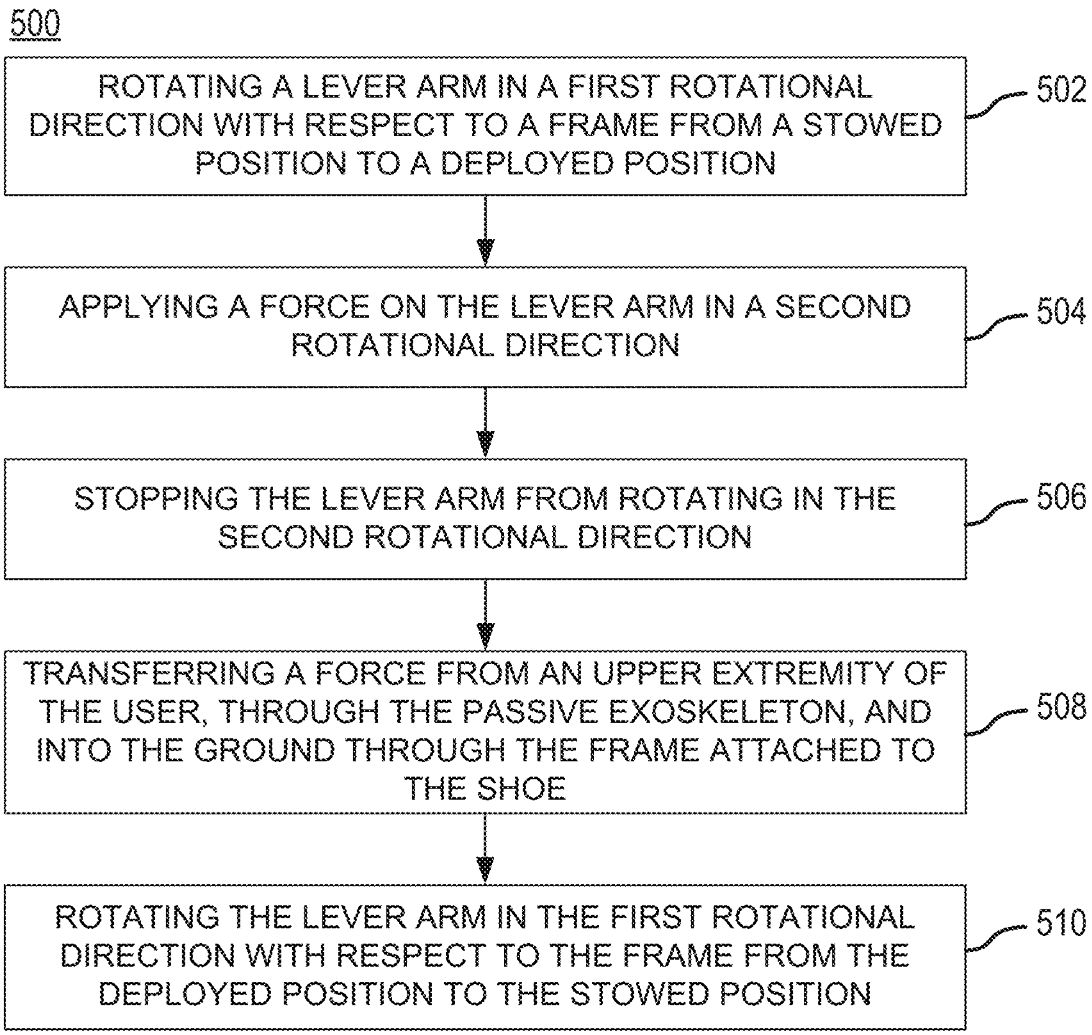
FIG. 12 is a flow chart for a method for operating a passive exoskeleton of the present disclosure, in accordance with various exemplary embodiments of the present disclosure.

Turning now to FIG. 12, illustrated is a flow chart for a method 500 for operating a wearable passive exoskeleton device, in accordance with various embodiments. For ease of description, the method 500 is described below with reference to FIG. 8 through FIG. 9B. The method 500 of the present disclosure, however, is not limited to use of the exemplary passive exoskeleton 300 of FIG. 8 through FIG. 9B.

In step 502, a user rotates lever arm 320 in a first rotational direction with respect to frame 310 from a stowed position (see FIG. 9A and FIG. 9B, the standing position of FIG. 4A, and the sitting position of FIG. 4B) to a deployed position (see FIG. 8, the sitting position of FIG. 4A, and the standing position of FIG. 4B). As the user rotates lever arm 320 from the stowed position to the deployed position, the user may exert a rotational force on lever arm 320 that overcomes the stopping force of second stopper 364. The second stopper 364 may flex away from the circular path of the lever arm 320 as the lever arm 320 pushes past the second stopper 364 and rotates to the deployed position.

In step 504, the user exerts or applies a force on the lever arm 320 in a second rotational direction, opposite the first rotational direction. In various embodiments, the user pushes the lever arm 320 in the second rotational direction, for example when moving from a sitting position to a standing position. In various embodiments, the user pulls the lever arm 320 in the second rotational direction, for example when moving from a standing position to a sitting position. However, the user may apply the force on the lever arm 320 in the second rotational direction however they, desire to provide sit-to-stand or stand-to-sit assistance, depending on the particular movement, position of the user's body, and user preference.

In step 506, the ratcheting pivot 530 stops the lever arm 320 from rotating in the second rotational direction. For example, ratcheting pivot 530 allows rotational motion in the first rotational direct while preventing rotational motion in the second rotational direction.

In step 508, the passive exoskeleton 300 transfers an assisting force (represented by dashed line 395 in FIG. 8) from an upper extremity of the user (e.g., the user's arm), through passive exoskeleton 300, and into the ground 396 though the frame attached to the shoe. More particularly, the assisting force 395 may be transferred through the lever arm 320, into ratcheting pivot 330, through frame 310 and the user's leg, through foot attachment 340 and the user's foot and/or shoe, and into the ground 396. The assisting force 395 may assist the user in a sit-to-stand and/or a stand-to-sit maneuver. In various embodiments, it is preferable that the assisting force 395 be transmitted through the foot attachment 340 to the shoe and into the ground 396.

In step 510, when the user is finished using the passive exoskeleton 300, the user rotates lever arm 320 in the first rotational direction with respect to frame 310 from the deployed position to the stowed position. As the user rotates lever arm 320 from the deployed position to the stowed position, the user may exert a rotational force on lever arm 320 that overcomes the stopping force of first stopper 362. The first stopper 362 may flex away from the circular path of the lever arm 320 as the lever arm 320 pushes past first stopper 362 and rotates to the stowed position. The second stopper 364 may stop the lever arm 320 from further rotation past the stowed position.

Figure 13A:
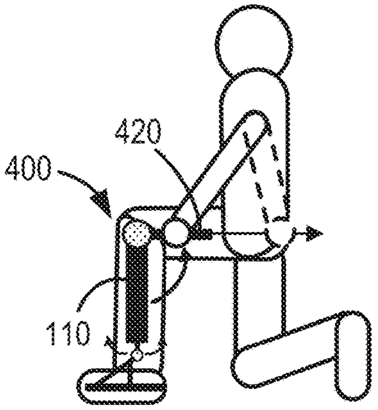
FIG. 13A, FIG. 13B, and FIG. 13C schematically illustrate an exemplary passive exoskeleton of the present disclosure having a telescoping lever arm in use in a kneeling position, a sitting position, and a bent over position, respectively, in accordance with various exemplary embodiments of the present disclosure.
Figure 13B:
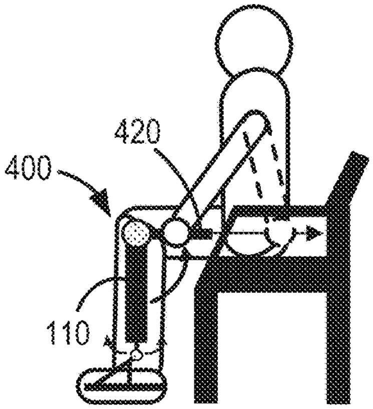
Figure 13C:
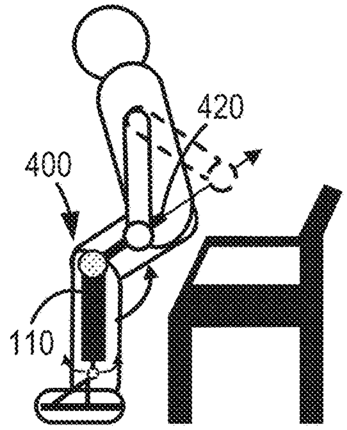

With reference to FIG. 13A, FIG. 13B, and FIG. 13C, an exemplary passive exoskeleton 400 is schematically illustrated having a telescoping lever arm 420, in accordance with various embodiments. Lever arm 420 may extend from a retracted position to an extended position to provide a user with extra leverage. FIG. 13A illustrates a user extending the lever arm 420 while kneeling. FIG. 13B illustrates a user extending the lever arm 420 while sitting. FIG. 13C illustrates a user extending the lever arm 420 while leaning before sitting. In this manner, lever arm 420 may be extendable to elongate the lever arm 420 so that the lever arm 420 is adjustable for the user to grab behind the user's center of gravity. It tends to be easier for someone to push themselves up from behind their body/center of gravity due to the reduced exerted strength from this position. In this manner, lever arm 420 may be extendable to various lengths for different users depending on the length of their femur.

Figure 14A:
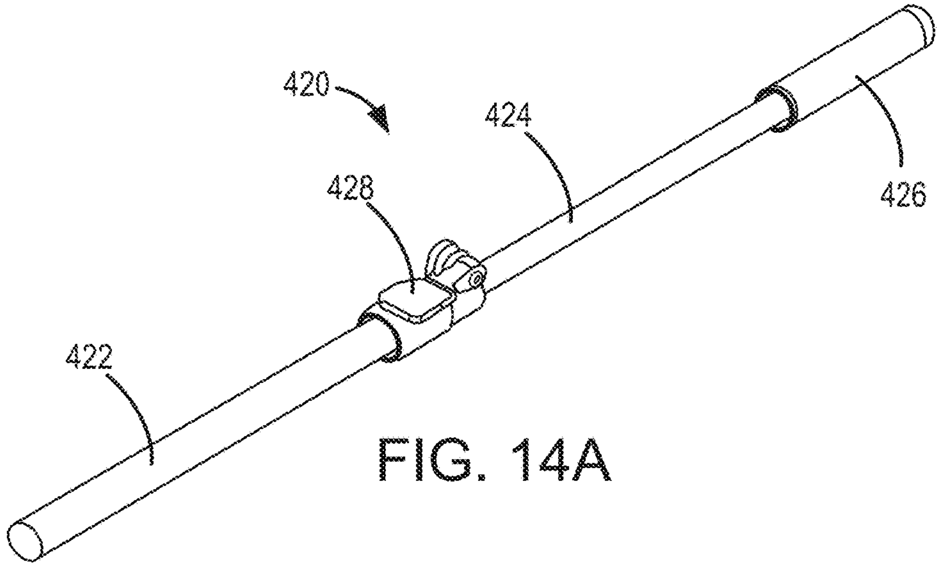
FIG. 14A and FIG. 14B illustrate perspective and side views, respectively, of an exemplary telescoping lever arm for a passive exoskeleton, in accordance with various exemplary embodiments of the present disclosure.
Figure 14B:
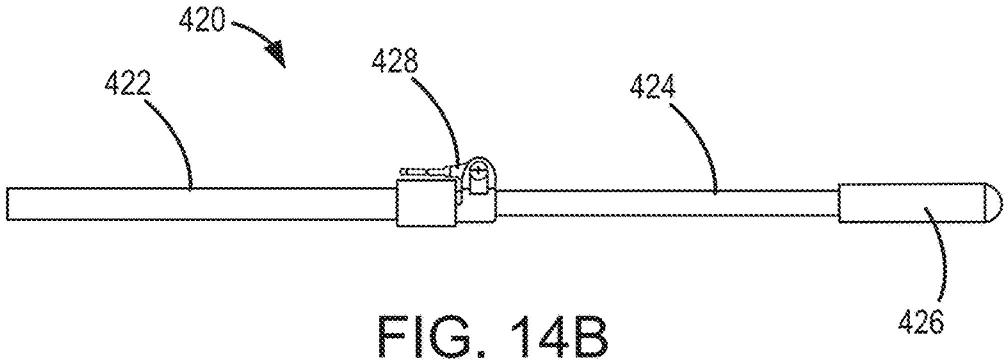

With reference to FIG. 14A and FIG. 14B, a perspective view of an exemplary telescoping lever arm 420 is illustrated, in accordance with various embodiments. Lever arm 420 may comprise a first rod 422 configured to receive a telescoping rod 424. First rod 422 may be configured to be attached to a ratcheting pivot (e.g., see ratcheting pivot 330 of FIG. 9B). Telescoping rod 424 may comprise a handle 426 at one end and may be telescopingly received into first rod 422 at the opposite end. Telescoping rod 424 may be locked at various positions with respect to first rod 422 using a lock member 428. In this manner, telescoping rod 424 may be configured to extend and retract to vary an overall length of telescoping lever arm 420. Lock member 428 may be moveable between a locked position wherein the lock member 428 exerts a compressive force on the telescoping rod 424 to prevent relative movement between first rod 422 and telescoping rod 424 and an unlocked position wherein the telescoping rod 424 may be slidably adjusted with respect to first rod 422.

A passive exoskeleton of the present disclosure may provide additional support for everyday activities and reduce muscle strain to assist a person from a kneeling or sitting position. A passive exoskeleton of the present disclosure may allow the user to be able to stand and sit anywhere without the use of large external devices. A passive exoskeleton of the present disclosure may quickly (e.g., in less than a minute) attach to any shoe and does not necessarily require any, strength or flexibility of the user.

A passive exoskeleton of the present disclosure may allow for both sit-to-stand and stand-to-sit transfer. A passive exoskeleton of the present disclosure may include a ratcheting mechanism (e.g., a ratcheting pivot) to allow the lever arm to be positioned for maximum pushing force. The ratcheting mechanism may allow for free motion in one direction and supports a force in the opposite direction. A passive exoskeleton of the present disclosure provides a structure along the leg that redirects all forces down to the ground. A passive exoskeleton of the present disclosure can assist a person rising from a kneeling position or from a sitting position. A passive exoskeleton of the present disclosure may be universal and easily attachable to the top and/or side of any shoe or user regardless of height or strength. A passive exoskeleton of the present disclosure provides additional support for everyday activities and reduces muscle strain to assist a person from a kneeling or sitting position. A passive exoskeleton of the present disclosure allows the user to be able to stand and sit anywhere without the use of large external devices. A passive exoskeleton of the present disclosure may attach to any shoe in less than 30 seconds and requires minimal strength and flexibility of the user. A passive exoskeleton of the present disclosure may be low profile and small enough to fit in a purse or small bag.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article; or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A wearable passive exoskeleton, comprising:

a leg exoskeleton frame configured to be coupled to a human leg; and a unidirectional lever arm rotatably coupled to the leg exoskeleton frame and configured to rotate from a stowed position, wherein the lever arm is substantially parallel with the human leg, to a deployed position so as to provide a handle for the user to move from a sitting position to a standing position, and wherein the lever arm is configured to rotate only in a single rotational direction.

2. The wearable passive exoskeleton of claim 1, further comprising a cushioned kneepad coupled to the leg exoskeleton frame.

3. The wearable passive exoskeleton of claim 1, wherein the lever arm is configured to rotate in a rotational direction from the stowed position to the deployed position, and wherein the lever arm is configured to rotate in the same rotational direction from the deployed position to the stowed position.

4. The wearable passive exoskeleton of claim 1, wherein the leg exoskeleton frame comprises an upper-most bracket and a lower-most bracket, and wherein the lever arm is pivotally coupled to the upper-most bracket.

5. The wearable passive exoskeleton of claim 4, wherein the leg exoskeleton frame further comprises a foot attachment pivotally coupled to the lower-most bracket.

6. The wearable passive exoskeleton of claim 4, wherein the leg exoskeleton frame further comprises a first tube and a second tube each extending from the upper-most bracket to the lower-most bracket.

7. The wearable passive exoskeleton of claim 4, wherein the leg exoskeleton frame is configured to extend substantially parallel to the user's leg.

8. A method for operating a passive exoskeleton, the method comprising:

rotating a lever arm in a first rotational direction with respect to a leg exoskeleton frame from a stowed position to a deployed position;

applying a force on the lever arm in a second rotational direction;

stopping the lever arm from rotating in the second rotational direction;

transmitting an assisting force through the passive exoskeleton and into a ground; and rotating the lever arm in the first rotational direction with respect to the leg exoskeleton frame from the deployed position to the stowed position.

9. The method of claim 8, wherein the lever arm is stopped from rotating in the second rotational direction by a ratcheting pivot coupled between the lever arm and the leg exoskeleton frame.

* * * * *